United States Patent
Torizuka et al.

(10) Patent No.: US 10,526,950 B2
(45) Date of Patent: Jan. 7, 2020

(54) VEHICLE AND EXHAUST PIPE SUPPORT MEMBER

(71) Applicants: HONDA MOTOR CO., LTD., Tokyo (JP); Sumitomo Riko Company Limited, Komaki-shi, Aichi (JP)

(72) Inventors: Daisuke Torizuka, Wako (JP); Yuichi Kamiya, Komaki (JP)

(73) Assignees: HONDA MOTOR CO., LTD., Tokyo (JP); SUMITOMO RIKO COMPANY LIMITED, Komaki-shi, Aichi-ken (JP)

( * ) Notice: Subject to any disclaimer, the term of this patent is extended or adjusted under 35 U.S.C. 154(b) by 0 days.

(21) Appl. No.: 15/603,740

(22) Filed: May 24, 2017

(65) Prior Publication Data

US 2017/0342890 A1 Nov. 30, 2017

(30) Foreign Application Priority Data

May 27, 2016 (JP) ................................. 2016-105868

(51) Int. Cl.
*B60K 13/00* (2006.01)
*F01N 13/18* (2010.01)
*B60K 13/04* (2006.01)

(52) U.S. Cl.
CPC .......... *F01N 13/1811* (2013.01); *B60K 13/04* (2013.01)

(58) Field of Classification Search
CPC ............. F01N 13/1822; F01N 13/1811; F01N 13/1806; F01N 3/10; B60K 13/04; B60K 5/1208
See application file for complete search history.

(56) References Cited

U.S. PATENT DOCUMENTS

| | | | | |
|---|---|---|---|---|
| 4,893,778 A * | 1/1990 | Drabing | ............. | F01N 13/1822 248/610 |
| 5,082,252 A * | 1/1992 | Miyamoto | ............. | F16F 13/18 180/312 |
| 6,402,119 B1 * | 6/2002 | Miska | .................... | B60K 13/04 248/58 |
| 6,454,236 B2 * | 9/2002 | Garaud | ............... | F01N 13/1822 248/60 |

(Continued)

FOREIGN PATENT DOCUMENTS

CN 104786827 A 7/2015
EP 0979930 A1 2/2000

(Continued)

OTHER PUBLICATIONS

Office Action dated Mar. 13, 2018, issued in counterpart Japanese Application No. 2016-105868, with English machine translation. (9 pages).

(Continued)

*Primary Examiner* — Hau V Phan
(74) *Attorney, Agent, or Firm* — Weterman, Hattori, Daniels & Adrian, LLP

(57) ABSTRACT

An exhaust pipe support member of a vehicle includes: an elastic support portion that has multiple insertion holes into which multiple hanger stays provided in an exhaust pipe are inserted; a metal frame that surrounds the elastic support portion; and multiple support legs that are arranged between the elastic support portion and the metal frame to support the elastic support portion.

16 Claims, 4 Drawing Sheets

(56) References Cited

U.S. PATENT DOCUMENTS

| | | | | |
|---|---|---|---|---|
| 6,851,506 B2* | 2/2005 | Bovio | ............... | B60K 13/04 180/296 |
| 7,575,216 B2* | 8/2009 | Zimmermann | ........ | B60K 13/04 248/60 |
| 7,637,472 B2* | 12/2009 | Endo | ............... | B60K 13/04 180/309 |
| 8,322,680 B2* | 12/2012 | Park | ............... | B60K 13/04 180/309 |
| 9,403,430 B2* | 8/2016 | Edo | ............... | F01N 13/1822 |
| 9,605,582 B1* | 3/2017 | Lee | ............... | F01N 13/1822 |
| 2003/0173489 A1* | 9/2003 | Kakimoto | ........ | F01N 13/1822 248/610 |
| 2008/0191117 A1* | 8/2008 | Steinmaier | ........ | F01N 13/1822 248/610 |
| 2009/0001242 A1* | 1/2009 | Endo | ............... | B60K 13/04 248/610 |
| 2009/0020678 A1* | 1/2009 | Miyata | ........... | B60K 13/04 248/610 |
| 2009/0174126 A1* | 7/2009 | Takeshima | ........ | B60K 5/1208 267/140.4 |
| 2011/0126521 A1* | 6/2011 | Ushijima | ........ | F01N 13/08 60/282 |
| 2011/0126522 A1* | 6/2011 | Ushijima | ........ | F01N 3/10 60/282 |
| 2015/0260076 A1* | 9/2015 | Makino | ........... | F01N 13/1822 248/636 |
| 2015/0300234 A1* | 10/2015 | Hirukawa | ........ | F01N 13/1805 180/309 |
| 2017/0234204 A1* | 8/2017 | Edo | ............... | F01N 13/1822 60/322 |

FOREIGN PATENT DOCUMENTS

| | | |
|---|---|---|
| GB | 2461284 A | 12/2009 |
| JP | 11-280460 A | 10/1999 |
| JP | 2002-371838 A | 12/2002 |
| JP | 2003-254055 A | 9/2003 |
| JP | 2005-155440 A | 6/2005 |
| JP | 2013-68288 A | 4/2013 |
| JP | 2013-231469 A | 11/2013 |

OTHER PUBLICATIONS

Office Action dated Jun. 18, 2019, issued in counterpart CN application No. 201710252803.X, with English translation. (15 pages).

Search Report dated Jun. 10, 2019, issued in counterpart application No. 201710252803.X. (2 pages).

Office Action dated Jan. 21, 2019, issued in counterpart CN Application No. 201710252803.X. with English translation (14 pages).

* cited by examiner

VEHICLE AND EXHAUST PIPE SUPPORT MEMBER

CROSS REFERENCES TO RELATED APPLICATIONS

The present application claims priority under 35 U.S.C. § 119 to Japanese Patent Application No. 2016-105868, filed May 27, 2016, entitled "Vehicle and Exhaust Pipe Support Member." The contents of this application are incorporated herein by reference in their entirety.

TECHNICAL FIELD

The present disclosure relates to a vehicle in which an exhaust pipe is supported to a vehicle body through an exhaust pipe support member, and an exhaust pipe support member.

BACKGROUND

Japanese Patent Application Publication No. 2013-068288 aims to provide an exhaust mount with hardware that can ensure a wide linear region of the spring characteristic, suppress heat deformation, and reduce the influence of variation in positions of assembly parts of exhaust members on the spring characteristic ([0016], Abstract).

To achieve this objective, an exhaust mount 10 of Japanese Patent Application Publication No. 2013-068288 (FIG. 1 and Abstract) includes mounting hardware 12 and a rubber elastic body 14. The mounting hardware 12 includes a first mounting portion 16 on the upper end side, which is a mounting part to the vehicle body, a bottom portion 18 on the lower end side, and a pair of side wall portions 20. The rubber elastic body 14 includes a second mounting portion 24 on the inner side, which is a mounting part to an exhaust member of an automobile, and a pair of rubber legs 34 that spread out to the right and left from the second mounting portion, and are attached by vulcanized bonding to the mounting hardware 12 at lower ends thereof. A scooped portion 48 is provided in a base part on the inside and on the bottom portion 18 side of each of the pair of rubber legs 34.

A circular fixing hole 26 is provided in the second mounting portion 24 (FIG. 1, [0041]). A support bar as an assembly part provided in an exhaust member is fitted into the fixing hole 26 ([0041]).

SUMMARY

As described above, Japanese Patent Application Publication No. 2013-068288 includes the second mounting portion 24 that has the circular fixing hole 26 through which the support bar (hanger stay) of the exhaust member is inserted (FIG. 1, [0041]). In Japanese Patent Application Publication No. 2013-068288, a single fixing hole 26 is formed, and therefore the number of support bars is assumed to be one.

When the exhaust member and the exhaust mount 10 are connected by a single support bar and a single fixing hole 26, the support bar is allowed to rotate around its axis, relative to the second mounting portion 24. Hence, the second mounting portion 24 may not be able to suppress vibration of the exhaust pipe in the rotation direction of the support bar, for example.

Thus, it is desirable to provide a vehicle and an exhaust pipe support member that can effectively suppress exhaust pipe vibration.

A first aspect of embodiments provides a vehicle in which an exhaust pipe is supported to a vehicle body through an exhaust pipe support member, characterized in that:
multiple hanger stays are provided in the exhaust pipe;
the exhaust pipe support member includes
an elastic support part that has multiple insertion holes into which the multiple hanger stays are inserted,
a metal frame that surrounds the elastic support part, and
multiple support legs that are arranged between the elastic support part and the metal frame to support the elastic support part; and
the multiple hanger stays are supported to the exhaust pipe support member while being inserted into the multiple insertion holes.

According to this aspect, for example, the multiple hanger stays are supported to the exhaust pipe support member while being inserted into the insertion holes of the elastic support part. With this, rotation of the exhaust pipe is restricted by each of the multiple hanger stays. Hence, it is possible to suppress vibration of the exhaust pipe when releasing gas through the exhaust pipe.

The exhaust pipe support member may include a fixing part that is fixed to a sub frame supporting an engine. With this, the exhaust pipe support member is fixed to the same sub frame as the engine. Hence, it is possible to support the exhaust pipe through the exhaust pipe support member, at a position relatively close to the engine. Accordingly, exhaust pipe vibration can be suppressed more easily.

The exhaust pipe support member may be shifted in the vehicle width direction from the exhaust pipe. Also, the multiple insertion holes may be arranged next to one another in the vertical direction of the vehicle. With this, it is easier to bring the lengths of the multiple hanger stays closer to one another than when the multiple insertion holes are arranged next to one another in the vehicle width direction. Hence, it is easier to ensure the strengths of the hanger stays, than when one of the hanger stays becomes longer by arranging the multiple insertion holes next to one another in the vehicle width direction.

The exhaust pipe may include a curved part that curves in the vertical direction. Also, a base part of a first hanger stay may be fixed to the curved part, and a base part of a second hanger stay may be fixed to the curved part in a higher position than or at the same height as the base part of the first hanger stay. Moreover, an insertion part of the first hanger stay may be inserted into a lower one of the insertion holes, and an insertion part of the second hanger stay may be inserted into an upper one of the insertion holes. With this, by making the relation among heights of the multiple hanger stays similar to the relation among heights of the multiple insertion holes, it is more easier to bring the lengths of the multiple hanger stays (first hanger stay and second hanger stay) closer to one another.

The metal frame may include two first wall parts that surround the multiple insertion holes in a direction in which the multiple insertion holes are arranged, and two second wall parts that surround the multiple insertion holes in a direction perpendicular to the direction in which the multiple insertion holes are arranged. Also, the multiple support legs may be arranged between the second wall parts and the elastic support part. With this, the support legs are arranged in a direction in which the multiple hanger stays are twisted, so that the exhaust pipe can be supported with higher strength.

Each of the multiple support legs may be arranged between each of the multiple insertion holes and the second wall part. With this, when the hanger stays are inserted into the insertion holes of the elastic support part, the multiple support legs are arranged between the hanger stays and the second wall parts. Accordingly, it is possible to effectively restrict transverse or horizontal shifting of one hanger stay relative to the other hanger stay.

The exhaust pipe support member may include an elastic frame that connects the multiple support legs on the metal frame side. Also, an outer surface of the elastic frame may abut on an inner surface of the metal frame. With this, it is easier to eliminate the positional difference of the support legs relative to the metal frame or the positional difference among the support legs.

One aspect of embodiments provides an exhaust pipe support member which supports an exhaust pipe to a supporting body, and is characterized by including:

an elastic support part that has multiple insertion holes into which multiple hanger stays provided in the exhaust pipe are inserted;

a metal frame that surrounds the elastic support part; and multiple support legs that are arranged between the elastic support part and the metal frame to support the elastic support part.

According to embodiments, for example, vibration of an exhaust pipe can be suppressed more effectively.

DETAILED DESCRIPTION

A. Embodiment
<A-1. Configuration>
[A-1-1. Overall Configuration]

Figure 1:
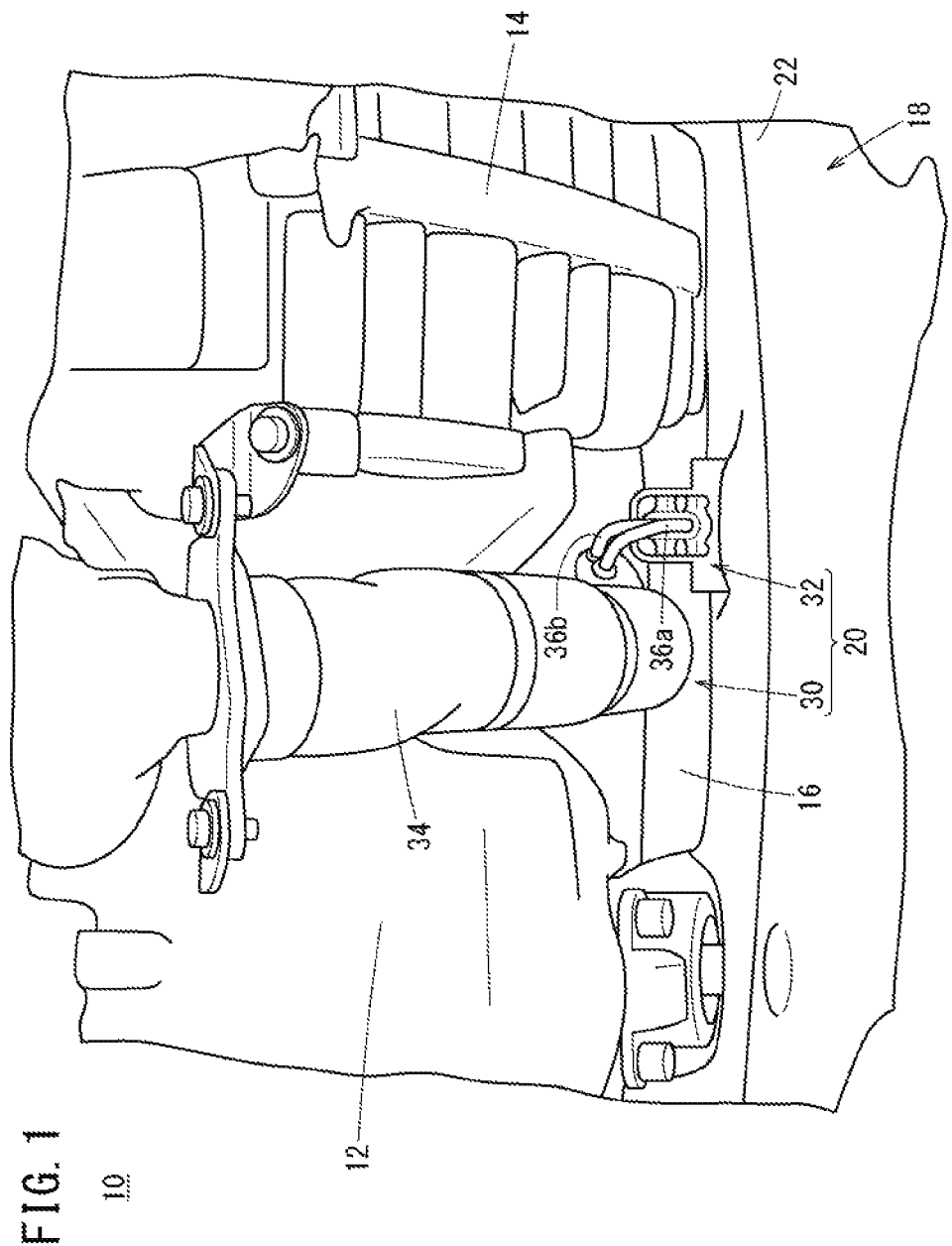
FIG. 1 is a simplified perspective view of a part of a vehicle of an embodiment of the present disclosure.

FIG. 1 is a simplified perspective view of a part of a vehicle 10 of an embodiment of the present disclosure. As shown in FIG. 1, the vehicle 10 has an engine 12, a transmission 14, a gear box 16, a vehicle body 18, and an exhaust structure 20. The vehicle body 18 (supporting body) has a sub frame 22 that supports the engine 12 and the transmission 14, an unillustrated main frame, and other parts.

[A-1-2. Exhaust Structure 20]
[A-1-2-1. Overview of Exhaust Structure 20]

The exhaust structure 20 is configured to release gas of the engine 12, and has an exhaust pipe unit 30 and an exhaust pipe mount 32 (also referred to as "mount 32" below). The exhaust pipe unit 30 has a front exhaust pipe 34, an unillustrated center exhaust pipe, and an unillustrated rear exhaust pipe. Multiple hanger stays 36a, 36b are provided in the front exhaust pipe 34.

The engine 12 of the embodiment is arranged on the front side of the vehicle 10. The front exhaust pipe 34, the center exhaust pipe, and the rear exhaust pipe are connected in the longitudinal direction of the vehicle 10, and releases exhaust gas of the engine 12 from the rear side of the vehicle 10.

(A-1-2-2. Front Exhaust Pipe 34)

Figure 2:
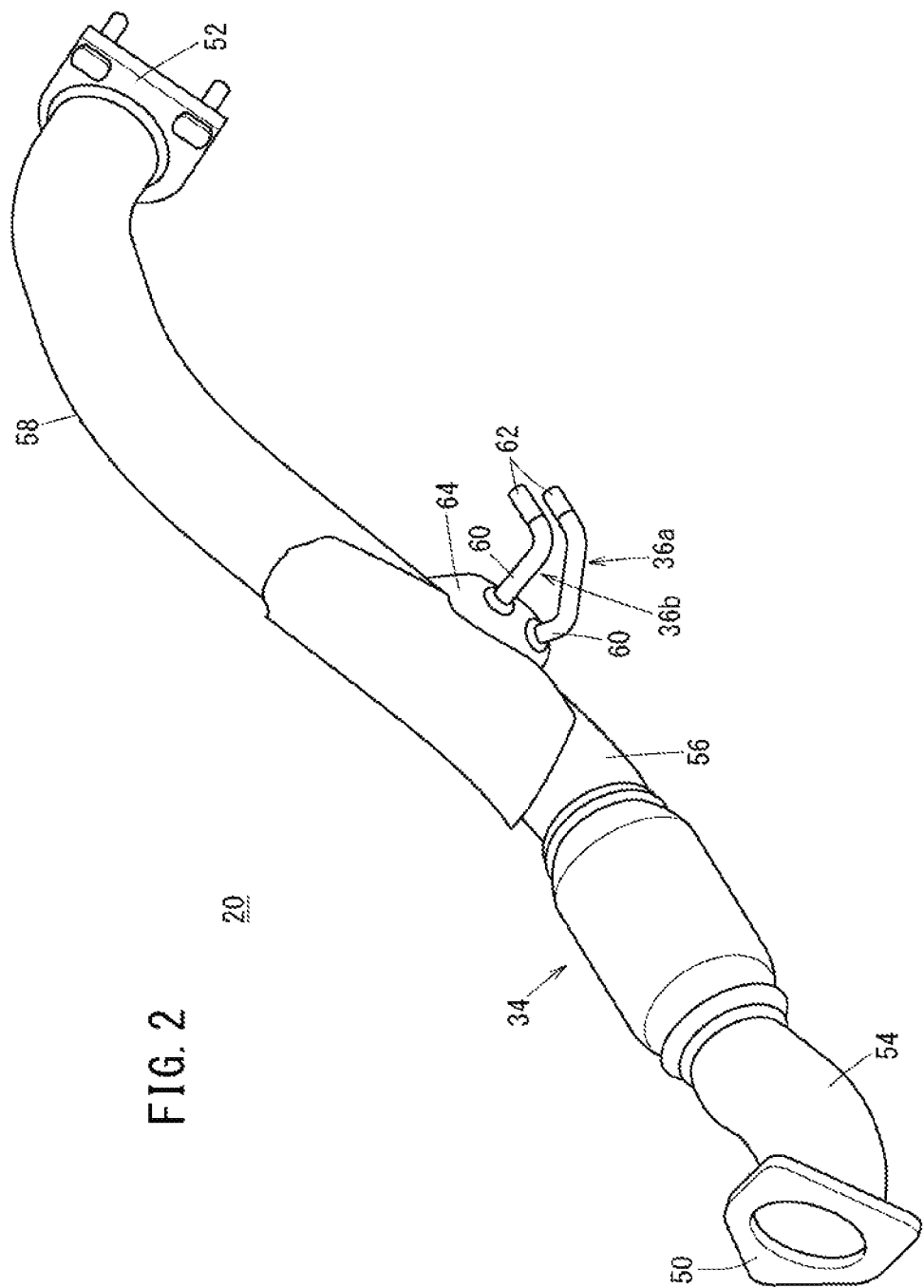
FIG. 2 is a perspective view of a part of an exhaust structure of the embodiment.

FIG. 2 is a perspective view of a part of the exhaust structure 20 of the embodiment. Specifically, FIG. 2 shows the front exhaust pipe 34 (also referred to as "exhaust pipe 34" below) and the hanger stays 36a, 36b. The exhaust pipe 34 in FIG. 2 has an engine side-connection portion 50 connected to an exhaust port of the engine 12, and an exhaust side-connection portion 52 connected to an exhaust port of the center exhaust pipe.

Hereinafter, the hanger stays 36a, 36b will also be referred to as "exhaust pipe side-hanger stays 36a, 36b" or "stays 36a, 36b, " and will be collectively referred to as "hanger stay 36," "exhaust pipe side-hanger stay 36," or "stay 36." Also, the hanger stay 36a will also be referred to as "first hanger stay 36a," and the hanger stay 36b will also be referred to as "second hanger stay 36b."

A first curved portion 54, a horizontal portion 56, and a second curved portion 58 are formed between the engine side-connection portion 50 and the exhaust side-connection portion 52. The first curved portion 54 is curved to connect the engine side-connection portion 50 to the exhaust port of the engine 12. The second curved portion 58 is curved in an upward protruding manner to avoid the gear box 16. As shown in FIG. 1, the exhaust pipe 34 is supported to the vehicle body 18 through the exhaust pipe mount 32.

(A-1-2-3. Exhaust Pipe Side-Hanger Stays 36a, 36b)

As shown in FIG. 1, the hanger stays 36a, 36b extend from the exhaust pipe 34, and are supported to the exhaust pipe mount 32 (FIG. 1). As shown in FIG. 2, the stays 36a, 36b extend from the substantial center of the exhaust pipe 34. This position is the "antinode" or its vicinity when the exhaust pipe 34 vibrates while the stays 36a, 36b are not supported to the mount 32.

As shown in FIG. 2, the stays 36a, 36b of the embodiment each has a base portion 60 on the exhaust pipe 34 side, and a mount connection portion 62 on the exhaust pipe mount 32 side. The base portion 60 is fixed to a stay support portion 64. The base portion 60 is formed in a part (tilted part) of the second curved portion 58 where the exhaust pipe 34 tilts obliquely upward toward the rear. As shown in FIG. 2, the positions where the base portions 60 of the stays 36a, 36b contact the exhaust pipe 34 are arranged along the longitudinal direction of the exhaust pipe 34.

It is possible to restrict rotation of the exhaust pipe 34 or of each stay 36, by providing multiple stays 36 and supporting each stay 36 to the mount 32.

(A-1-2-4. Exhaust Pipe Mount 32)
(A-1-2-4-1. Overview of Exhaust Pipe Mount 32)

The exhaust pipe mount 32 supports the stays 36a, 36b, and thereby supports the exhaust pipe 34 to the vehicle body 18. As shown in FIG. 1, the mount 32 is shifted in the vehicle width direction from the exhaust pipe 34.

Figure 3:
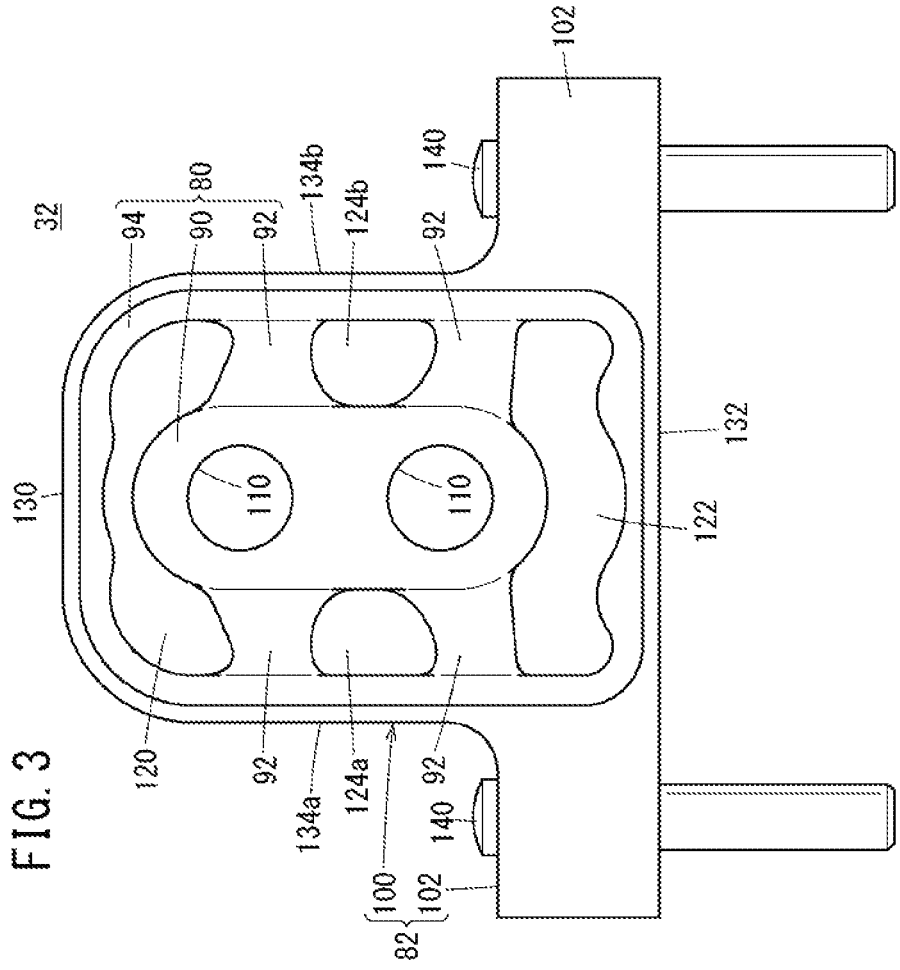
FIG. 3 is a front view of an exhaust pipe mount of the embodiment.

FIG. 3 is a front view of the exhaust pipe mount 32 of the embodiment. As shown in FIG. 3, the mount 32 has an elastic member 80 and a bracket 82 (frame member). The elastic member 80 is made of resin (e.g., made of rubber such as ethylene propylene diene rubber (EPDM)), and has an elastic support portion 90, multiple support legs 92, and an elastic frame 94. The elastic support portion 90, the support legs 92, and the elastic frame 94 are formed as one body by injection molding, for example. Alternatively, the elastic support portion 90, the support legs 92, and the elastic frame 94 may be formed separately, and then be fixed together by vulcanized bonding, adhesion with a bond, or the like.

The bracket 82 is made of metal (e.g., made of aluminum), and has a metal frame 100 and a fixing portion 102. The metal frame 100 and the fixing portion 102 are formed as one body by cutting, casting, forging, pressing, or the like. Alternatively, the metal frame 100 and the fixing portion 102 maybe formed separately, and then be fixed together by welding, bolt fastening, or the like. The elastic member 80 is fixed to the bracket 82 by self-adhesion (adhesion by vulcanization). Alternatively, the elastic member 80 maybe fixed to the bracket 82 by other methods (e.g., adhesion with a bond).

(A-1-2-4-2. Elastic Support Portion 90)

The elastic support portion 90 is a part that supports the stays 36a, 36b directly, and is basically a rectangular parallelepiped with semicircles added to upper and lower parts thereof. The elastic support portion 90 has multiple insertion holes 110 (stay insertion holes) into which multiple exhaust pipe side-hanger stays 36a, 36b are inserted. As is clear from FIGS. 1 and 3, the multiple insertion holes 110 are arranged next to one another in the vertical direction of the vehicle 10.

The support legs 92 and the elastic frame 94 form relatively large openings 120, 122 in the direction in which the insertion holes 110 are arranged (vertical direction in FIG. 3). Additionally, relatively small openings 124a, 124b are formed between adjacent support legs 92 in the direction in which the insertion holes 110 are arranged. Even if vibration of the exhaust pipe 34 is transmitted to the elastic support portion 90 through the stays 36a, 36b, the vibration can be suppressed by these openings 120, 122, 124a, 124b and the elastic member 80.

(A-1-2-4-3. Support Leg 92)

The support leg 92 is arranged between the elastic support portion 90 and the metal frame 100 to support the elastic support portion 90. The support legs 92 are arranged between the elastic support portion 90 and side wall portions 134a, 134b of the metal frame 100. More specifically, each of the support legs 92 is arranged between each of the multiple insertion holes 110 of the elastic support portion 90 and the corresponding side wall portion 134a, 134b. The support leg 92 is the widest on the elastic support portion 90 side. The support leg 92 narrows toward the elastic frame 94 from the elastic support portion 90, and widens near the elastic frame 94.

(A-1-2-4-4. Elastic Frame 94)

The elastic frame 94 connects the multiple support legs 92 on the metal frame 100 side. An outer surface of the elastic frame 94 abuts on an inner surface of the metal frame 100. As mentioned earlier, the elastic member 80 (elastic frame 94) is fixed to the bracket 82 by self-adhesion (adhesion by vulcanization). The elastic frame 94 is basically a rectangle or a rectangular parallelepiped formed along the metal frame 100.

(A-1-2-4-5. Metal Frame 100)

The metal frame 100 is a member that is basically a rectangle or a rectangular parallelepiped surrounding the elastic member 80. The metal frame 100 has an upper wall portion 130, a lower wall portion 132, and the two side wall portions 134a, 134b. The upper wall portion 130 and the lower wall portion 132 function as first wall parts that surround the multiple insertion holes 110 in the direction (vertical direction in FIG. 3) in which the multiple insertion holes 110 are arranged. Meanwhile, the side wall portions 134a, 134b function as second wall parts that surround the multiple insertion holes 110 in a direction (transverse direction in FIG. 3) perpendicular to the direction in which the multiple insertion holes 110 are arranged.

It is possible to restrict vertical and transverse shifting of the elastic member 80 (including the elastic support portion 90), by surrounding the elastic member 80 with the metal frame 100 in vertical and transverse directions.

(A-1-2-4-6. Fixing Portion 102)

The fixing portion 102 is a part for fixing the entire mount 32 to the sub frame 22 of the vehicle body 18. In the embodiment, the fixing portion 102 is arranged on both ends on the lower side of the metal frame 100. Unillustrated bolt holes are formed in the fixing portion 102. With this, the fixing portion 102 is fixed to the sub frame 22 through bolts 140 (fastening members) and unillustrated nuts (see FIGS. 1 and 3). The nut may be configured as a threaded part formed in the sub frame 22. Also, the fixing portion may be fixed to the vehicle body 18 by fitting or welding, for example, instead of the bolts 140.

The fixing portion 102 is basically a rectangular parallelepiped, and a lower surface of the fixing portion 120 abuts on the sub frame 22 (see FIG. 1).

<A-2. Effects of Embodiment>

As has been described, according to the embodiment, the multiple hanger stays 36a, 36b are supported to the exhaust pipe mount 32 (exhaust pipe support member) while being inserted into the insertion holes 110 of the elastic support portion 90 (FIG. 1). With this, rotation of the exhaust pipe 34 is restricted by each of the multiple hanger stays 36a, 36b. Hence, it is possible to suppress vibration of the exhaust pipe 34 when releasing gas through the exhaust pipe 34.

In the embodiment, the exhaust pipe mount 32 (exhaust pipe support member) includes the fixing portion 102 that is fixed to the sub frame 22 supporting the engine 12 (FIGS. 1 and 3). With this, the mount 32 is fixed to the same sub frame 22 as the engine 12. Hence, it is possible to support the exhaust pipe 34 through the mount 32, at a position relatively close to the engine 12. Accordingly, vibration of the exhaust pipe 34 can be suppressed more easily.

In the embodiment, the exhaust pipe mount 32 (exhaust pipe support member) is shifted in the vehicle width direction from the exhaust pipe 34 (FIG. 1). In addition, the multiple insertion holes 110 are arranged next to one another in the vertical direction of the vehicle 10 (FIGS. 1 and 3). With this, it is easier to bring the lengths of the multiple hanger stays 36a, 36b closer to one another than when the multiple insertion holes 110 are arranged next to one another in the vehicle width direction. Hence, it is easier to ensure the strengths of the hanger stays 36a, 36b, than when one of the hanger stays 36a, 36b becomes longer by arranging the multiple insertion holes 110 next to one another in the vehicle width direction.

In the embodiment, the exhaust pipe 34 includes the second curved portion 58 (curved part) that curves in the vertical direction (FIG. 2). Additionally, the base portion 60 of the first hanger stay 36a is fixed to the second curved portion 58, and the base portion 60 of the second hanger stay 36b is fixed to the second curved portion 58 in a higher position than the base portion 60 of the first hanger stay 36a (FIG. 2). Moreover, the mount connection portion 62 (insertion part) of the first hanger stay 36a is inserted into a lower one of the insertion holes 110, and the mount connection portion 62 of the second hanger stay 36b is inserted into an upper one of the insertion holes 110 (FIGS. 1 to 3). With this, by making the relation among heights of the multiple hanger stays 36a, 36b similar to the relation among heights of the multiple insertion holes 110, it is more easier to bring the lengths of the multiple hanger stays 36a, 36b closer to one another.

In the embodiment, the metal frame 100 includes the upper wall portion 130 and the lower wall portion 132 (first wall parts) that surround the multiple insertion holes 110 in the direction (vertical direction in FIG. 3) in which the multiple insertion holes 110 are arranged, and the two side wall portions 134a, 134b (second wall parts) that surround the multiple insertion holes 110 in the direction (transverse direction in FIG. 3) perpendicular to the direction in which the multiple insertion holes 110 are arranged (FIG. 3). Also, the multiple support legs 92 are arranged between the side wall portions 134a, 134b and the elastic support portion 90 (FIG. 3). With this, the support legs 92 are arranged in a direction in which the multiple hanger stays 36a, 36b are twisted (transverse or horizontal direction in which one hanger stay moves relative to the other hanger stay). Hence, the exhaust pipe 34 can be supported with higher strength.

In the embodiment, each of the multiple support legs 92 is arranged between each of the multiple insertion holes 110 and the corresponding side wall portion 134a, 134b (FIG. 3). With this, when the exhaust pipe side-hanger stays 36a, 36b are inserted into the insertion holes 110 of the elastic support portion 90, the multiple support legs 92 are arranged between the stays 36a, 36b and the side wall portions 134a, 134b. Accordingly, it is possible to effectively restrict transverse or horizontal shifting of one stay 36 (e.g., stay 36a) relative to the other stay 36 (e.g., stay 36b).

In the embodiment, the exhaust pipe mount 32 (exhaust pipe support member) includes the elastic frame 94 that connects the multiple support legs 92 on the metal frame 100 side (FIG. 3). Additionally, the outer surface of the elastic frame 94 abuts on the inner surface of the metal frame 100 (FIG. 3). With this, it is easier to eliminate the positional difference of the support legs 92 relative to the metal frame 100 or the positional difference among the support legs 92.

B. Modification

Note that the present invention is not limited to the above embodiment, and various configurations can be made on the basis of the contents of the specification, as a matter of course. For example, the following configuration may be adopted.

<B-1. Application>

In the embodiment, the present disclosure has been applied to the vehicle 10 (FIG. 1). However, if the focus is on the multiple stays 36a, 36b or the multiple insertion holes 110, for example, the disclosure is not limited to this embodiment. For example, the disclosure may be applied to a moving object such as an aircraft and a ship. Alternatively, the present disclosure may be used in a movable device such as a crane. In these cases, the mount 32 supports the exhaust pipe 34 to a supporting body corresponding to the vehicle body 18.

<B-2. Exhaust Pipe 34>

In the above embodiment, the front exhaust pipe 34 is the exhaust pipe in which the stays 36a, 36b are provided (FIGS. 1 and 2). However, if the focus is on the function of the multiple stays 36a, 36b or the multiple insertion holes 110, for example, the disclosure is not limited to this embodiment. For example, the stays 36a, 36b may be provided in the center exhaust pipe or the rear exhaust pipe.

In the above embodiment, the exhaust pipe unit 30 is formed as a combination of the front exhaust pipe 34, the center exhaust pipe, and the rear exhaust pipe. However, if the focus is on releasing gas of the engine 12, for example, the disclosure is not limited to this embodiment. For example, a single exhaust pipe may be formed instead of separating it into the front exhaust pipe 34, the center exhaust pipe, and the rear exhaust pipe.

<B-3. Exhaust Pipe Side-Hanger Stays 36a, 36b>

The above embodiment includes two stays 36a, 36b (FIG. 2). However, if the focus is on providing multiple stays 36 to restrict rotation of the exhaust pipe 34 or the stay 36, three or more (e.g., three or four) stays 36 may be provided. The number of insertion holes 110 changes accordingly. Alternatively, the number of base portions 60 may be one, as long as the stay branches into two or more on the elastic support portion 90 side.

In the above embodiment, the base portions 60 of the stays 36a, 36b are arranged along the longitudinal direction of the exhaust pipe 34 (FIG. 2). However, if the focus is on providing multiple stays 36a, 36b on the exhaust pipe 34, for example, the disclosure is not limited to this embodiment.

Figure 4:
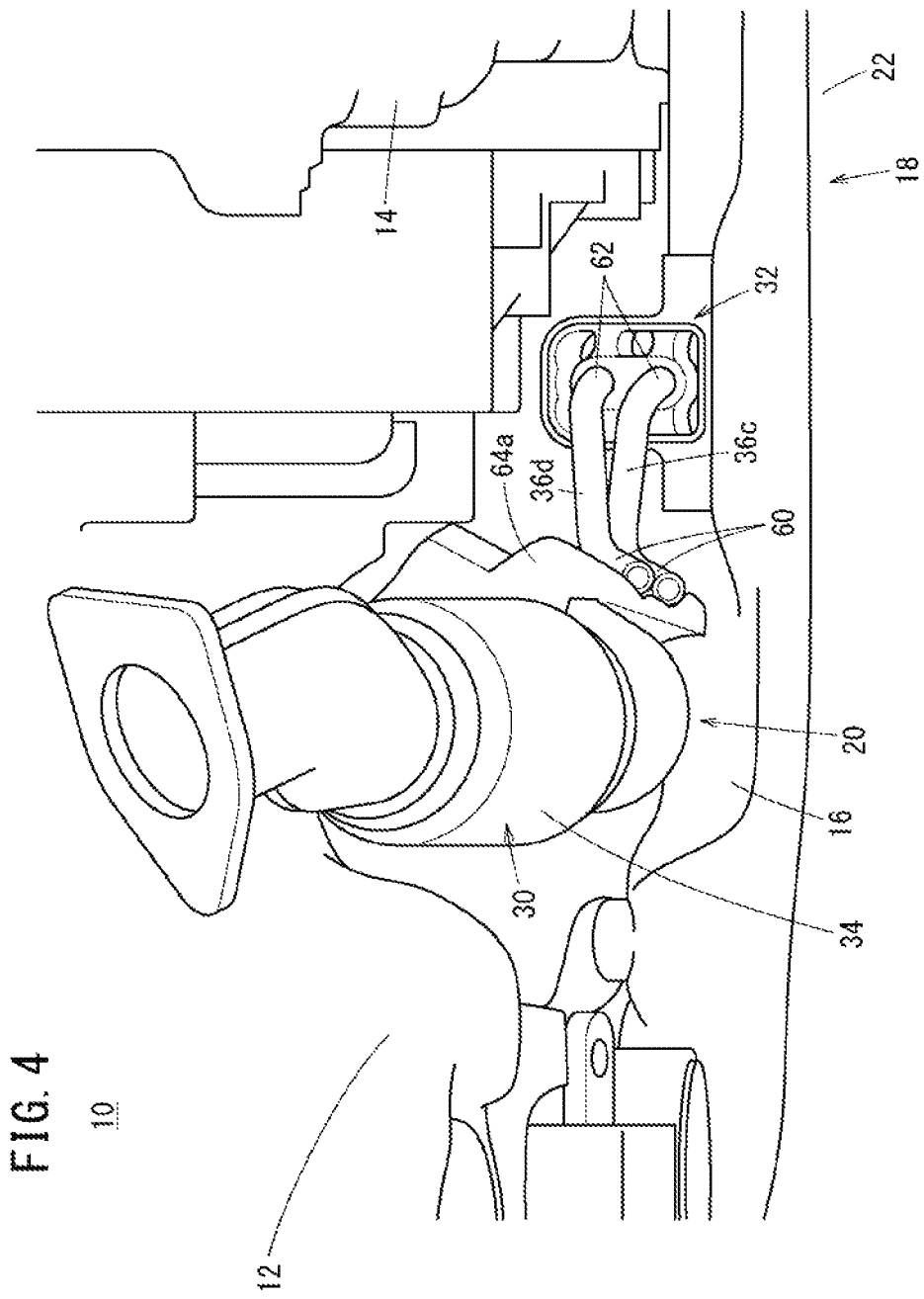
FIG. 4 is a perspective view of exhaust pipe side-hanger stays of a modification, and the periphery thereof.

FIG. 4 is a perspective view of exhaust pipe-side hanger stays 36c, 36d (also referred to as "stays 36c, 36d" below) of a modification, and the periphery thereof. Base portions 60 of the stays 36c, 36d of FIG. 4 are arranged perpendicular to the longitudinal direction of an exhaust pipe 34. In other words, the base portions 60 are arranged in substantially the same position in the longitudinal direction of the exhaust pipe 34.

Additionally, the base portions 60 of the stays 36c, 36d of FIG. 4 abut on a stay fixing portion 64a at points arranged along the longitudinal direction. The stay fixing portion 64a is fixed to the exhaust pipe 34. With this, by increasing the contact area between the base portions 60 and the stay fixing portion 64a, the stays 36c, 36d can be fixed with higher strength.

<B-4. Exhaust Pipe Mount 32 (Exhaust Pipe Support Member)>

[B-4-1. Overall Arrangement]

In the above embodiment, the exhaust pipe mount 32 is shifted in the vehicle width direction from the exhaust pipe (FIG. 1). However, if the focus is on providing multiple stays 36 or multiple insertion holes 110, for example, the disclosure is not limited to this embodiment. For example, the mount 32 may be arranged below the exhaust pipe 34.

[B-4-2. Elastic Member 80]

In the above embodiment, the elastic member 80 includes the elastic support portion 90, the support legs 92, and the elastic frame 94 (FIG. 3). However, if the focus is on functions of the elastic support portion 90 and the support legs 92, for example, the elastic frame 94 may be omitted.

In the above embodiment, the two insertion holes 110 are arranged next to each other in the vertical direction of the vehicle 10 (FIGS. 1 and 3). However, if the focus is on providing multiple stays 36 or multiple insertion holes 110, for example, the disclosure is not limited to this embodiment. For example, two insertion holes 110 may be arranged next to each other in the vehicle width direction.

In the above embodiment, a pair of (a total of four) support legs 92 is provided on the right and left of each of the two insertion holes 110 (FIG. 3). However, if the focus is on arranging the support legs between the elastic support portion 90 and the metal frame 100 to support the elastic support portion 90, for example, the disclosure is not limited to this embodiment. For example, one (a total of two) or three (a total of six) support legs 92 may be provided in each gap between the elastic support portion 90 and the side wall portions 134a, 134b. Alternatively, one (a total of two) or two (a total of four) support legs 92 may be provided in each gap between the elastic support portion 90 and the upper and lower wall portions 130, 132. Alternatively, the support legs 92 may be provided between the elastic support portion 90 and the side wall portions 134a, 134b, as well as between the elastic support portion 90 and the upper and lower wall portions 130, 132.

In the above embodiment, the insertion hole 110 is circular (FIG. 3). However, if the focus is on supporting the stay 36 by the elastic support portion 90, for example, the disclosure is not limited to this embodiment. For example, the insertion hole 110 maybe rectangular. In this case, the mount connection portion 62 (insertion part) of the stay 36 is formed into a shape corresponding to the insertion hole 110.

[B-4-3. Bracket 82 (Frame Member)]

The above embodiment is based on the premise that all of the four wall portions (upper wall portion 130, lower wall portion 132, and two side wall portions 134a, 134b) constituting the metal frame 100 are flat plates (FIGS. 1 and 3). However, if the focus is on surrounding the elastic member 80, for example, one or multiple wall portions may be bent plates or curved surfaces.

In the above embodiment, the metal frame 100 surrounds the elastic member 80 with the four wall portions (upper wall portion 130, lower wall portion 132, and two side wall portions 134a, 134b) (FIGS. 1 and 3). However, if the focus is on surrounding the entire periphery of the elastic member 80, for example, the metal frame 100 may be formed into another frame shape or a ring shape.

In the above embodiment, the metal frame 100 is formed into a ring shape (a shape that covers the entire periphery of the elastic member 80), and the metal frame 100 surrounds the elastic member 80 in vertical and transverse directions in FIG. 3 (FIG. 3). However, if the focus is on restricting shifting of the elastic support portion 90 in at least one or multiple directions, for example, the disclosure is not limited to this embodiment. For example, the upper wall portion 130 may be omitted.

In the above embodiment, the metal frame 100 and the fixing portion 102 are different parts (FIG. 3). However, if the focus is on fixing the metal frame 100 to the vehicle body 18 (supporting body), for example, the disclosure is not limited to this embodiment. For example, the metal frame 100 may be directly fixed to the vehicle body 18 by welding or bonding.

In the above embodiment, the fixing portion 102 is fixed to the sub frame 22 of the vehicle body 18 (FIG. 1). However, if the focus is on functions of the elastic support portion 90 and the support legs 92, for example, the fixing portion may be fixed to other parts (e.g., main frame). Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A vehicle comprising:
   an exhaust pipe supported to a vehicle body through an exhaust pipe support member; and
   a plurality of hanger stays provided to said exhaust pipe, wherein each of the plurality of hanger stays has one end fixed to said exhaust pipe and an opposite end opposite to the one end, the opposite end being attached to said exhaust pipe support member,
   wherein
   said exhaust pipe support member is fixed to said vehicle body,
   said exhaust pipe support member includes:
      an elastic support part that has a plurality of insertion holes, each of the insertion holes receiving corresponding one of the opposite ends of the plurality of hanger stays,
      a metal frame that surrounds said elastic support part, and
      a plurality of support legs that are disposed between said elastic support part and said metal frame to support said elastic support part.

2. The vehicle according to claim 1, wherein said exhaust pipe support member includes a fixing part that is fixed to a sub frame supporting an engine of the vehicle.

3. The vehicle according to claim 1, wherein:
   said exhaust pipe support member is disposed at a position shifted in the vehicle width direction from said exhaust pipe; and
   said plurality of insertion holes are arranged next to one another in the vertical direction of said vehicle.

4. The vehicle according to claim 3, wherein:
   said exhaust pipe includes a curved part that curves in the vertical direction;
   the plurality of hanger stays includes a first hanger stay and a second hanger stay, and the plurality of insertion holes includes two insertion holes arranged next to one another in the vertical direction of said vehicle;
   a base part of the first hanger stay is fixed to said curved part;
   a base part of the second hanger stay is fixed to said curved part located at a higher position than or at the same height as the curved part fixed to the base part of said first hanger stay;
   an insertion part of said first hanger stay is inserted into a lower-located one of said two insertion holes; and
   an insertion part of said second hanger stay is inserted into an upper-located one of said two insertion holes.

5. The vehicle according to claim 4, wherein the base part of the second hanger stay is located next to the base part of the first hanger stay in a longitudinal direction of the vehicle.

6. The vehicle according to claim 3, wherein said exhaust pipe support member is disposed in the vehicle width direction of said exhaust pipe.

7. The vehicle according to claim 1, wherein:
   said metal frame includes:
      a pair of two first wall parts that surround said plurality of insertion holes in a direction in which said plurality of insertion holes are arranged next to one another, and
      a pair of two second wall parts that surround said plurality of insertion holes in a direction perpendicular to the direction in which said plurality of insertion holes are arranged; and
   said plurality of support legs are arranged between each of said second wall parts and said elastic support part.

8. The vehicle according to claim 7, wherein each of said plurality of support legs is arranged between each of said plurality of insertion holes and said second wall parts.

9. The vehicle according to claim 7, wherein an opening is disposed between each of the first wall parts and the elastic support part.

10. The vehicle according to claim 7, wherein each of the plurality of support legs has a width wider on an elastic support part side thereof than a width thereof on a second wall part side thereof.

11. The vehicle according to claim 1, wherein:
    said exhaust pipe support member includes an elastic frame connected to a metal frame side end of each of said plurality of support legs; and
    an outer surface of said elastic frame abuts on an inner surface of said metal frame.

12. The vehicle according to claim 1, wherein the plurality of support legs is made of elastic material and connects the elastic support part to the metal frame.

13. The vehicle according to claim 1, wherein the plurality of support legs are disposed on one side of said elastic support part, and the plurality of support legs are disposed on an opposite side of said elastic support part opposite to the one side.

14. An exhaust pipe support member that supports an exhaust pipe to a supporting body of a vehicle, said exhaust pipe support member comprising:
  an elastic support part that has a plurality of insertion holes which receive a plurality of hanger stays provided to said exhaust pipe, wherein each of the plurality of hanger stays has one end fixed to said exhaust pipe and an opposite end opposite to the one end, the opposite end being attached to said exhaust pipe support member, each of the insertion holes receiving corresponding one of the opposite ends of the plurality of hanger stays;
  a metal frame that surrounds said elastic support part;
  a plurality of support legs that are disposed between said elastic support part and said metal frame to support said elastic support part; and
  an elastic frame provided along an inner circumference of the metal frame to surround said elastic support part, the elastic frame being connected to the plurality of support legs,
  wherein said exhaust pipe support member is fixed to the supporting body of the vehicle.

15. The exhaust pipe support member according to claim 14, wherein the plurality of support legs are disposed on one side of said elastic support part, and the plurality of support legs are disposed on an opposite side of said elastic support part opposite to the one side.

16. The exhaust pipe support member according to claim 14, wherein the plurality of insertion holes includes a first insertion hole and a second insertion hole,
  the elastic support part includes a first elastic part which entirely surrounds the first insertion hole and a second elastic part which entirely surrounds the second insertion hole,
  the first elastic part and the second elastic part are connected with each other on a line which passes through a center of the first insertion hole and a center of the second insertion hole.

\* \* \* \* \*